(12) United States Patent
Alnahlawi

(10) Patent No.: US 8,095,560 B2
(45) Date of Patent: Jan. 10, 2012

(54) EDGE ATTRIBUTE AGGREGATION IN A DIRECTED GRAPH

(75) Inventor: Mahmoud Alnahlawi, Santa Cruz, CA (US)

(73) Assignee: Yahoo! Inc., Sunnyvale, CA (US)

( * ) Notice: Subject to any disclaimer, the term of this patent is extended or adjusted under 35 U.S.C. 154(b) by 331 days.

(21) Appl. No.: 12/393,575

(22) Filed: Feb. 26, 2009

(65) Prior Publication Data

US 2010/0217695 A1  Aug. 26, 2010

(51) Int. Cl.
G06F 7/00 (2006.01)
G06Q 30/00 (2006.01)

(52) U.S. Cl. ............... 707/792; 707/999.009; 705/14.43; 705/14.69

(58) Field of Classification Search ............... 705/14.45, 705/14.46, 14.69, 30, 34, 14.43, 14.68; 370/338, 370/392, 401; 707/706, 792, 805, 999.003, 707/999.009
See application file for complete search history.

(56) References Cited

U.S. PATENT DOCUMENTS

| | | | |
|---|---|---|---|
| 5,881,246 A * | 3/1999 | Crawley et al. | 709/238 |
| 6,963,897 B1 * | 11/2005 | Hubbard | 709/201 |
| 7,167,181 B2 * | 1/2007 | Duluk et al. | 345/506 |
| 7,184,437 B1 * | 2/2007 | Cole et al. | 370/392 |
| 7,310,335 B1 * | 12/2007 | Garcia-Luna-Aceves et al. | 370/390 |
| 7,334,047 B1 * | 2/2008 | Pillay-Esnault | 709/242 |
| 7,340,453 B2 * | 3/2008 | Raman et al. | 707/742 |
| 7,342,897 B1 * | 3/2008 | Nader et al. | 370/255 |
| 7,362,727 B1 * | 4/2008 | O'Neill et al. | 370/331 |
| 7,380,020 B2 * | 5/2008 | Grimminger | 709/242 |
| 7,483,387 B2 * | 1/2009 | Guichard et al. | 370/252 |
| 7,512,120 B2 * | 3/2009 | Takahashi et al. | 370/354 |
| 7,580,944 B2 * | 8/2009 | Zhuge et al. | 1/1 |
| 7,634,230 B2 * | 12/2009 | Ji et al. | 455/41.2 |
| 7,808,503 B2 * | 10/2010 | Duluk et al. | 345/506 |
| 7,840,006 B2 * | 11/2010 | Ogawa et al. | 380/201 |
| 7,881,667 B2 * | 2/2011 | Ji et al. | 455/41.2 |
| 2001/0014868 A1 * | 8/2001 | Herz et al. | 705/14 |

* cited by examiner

*Primary Examiner* — Andrew Joseph Rudy
(74) *Attorney, Agent, or Firm* — Weaver Austin Villeneuve & Sampson LLP

(57) ABSTRACT

Methods and apparatus are described by which edge attribute data relating to a system that may be represented by a directed graph may be efficiently aggregated despite the presence of virtual entities in the system for which edge attribute data aggregation is not useful or meaningful.

14 Claims, 4 Drawing Sheets

EDGE ATTRIBUTE AGGREGATION IN A DIRECTED GRAPH

BACKGROUND OF THE INVENTION

The present invention relates to aggregating attribute data relating to systems that may be represented as directed graphs and, in particular, to techniques for dealing with virtual nodes during attribute aggregation.

A directed graph is a graph in which ordered pairs of nodes are connected with directed edges having associated attributes that define or characterize a relationship between the connected nodes. Many types of data representative of many types of systems may be represented using directed graphs. For example, interactions among entities (e.g., users, computing devices, networks or sub-networks, etc.) in a computing environment (e.g., the Internet, the World Wide Web, enterprise intranets, etc.) may be represented with a directed graph in which the attributes associated with the directed edges represent the interactions or relationships between connected entities. As will be understood by those of skill in the art, the data represented by a directed graph may be mined and processed in a variety of ways using a variety of techniques to identify and/or aggregate behavior or events of interest.

One example of a system that may be modeled using a directed graph is an online advertising exchange. An advertising exchange, such as the APT platform provided by Yahoo! Inc. of Sunnyvale, Calif. (http://apt.yahoo.com), is an online marketplace in which connections are made between the inventory of smaller online publishers (e.g., advertising space on a blogger's web site) and the inventory of advertisers (e.g., advertisements or advertising content). Advertisers pay according to a variety of economic models for events (e.g., ad impressions, users clicking on ads, conversion events, etc.) relating to the placement of their advertisements on such web pages. Such events are referred to generally herein as "advertising events" or "ad events." Third parties (e.g., brokers, agents, agencies, networks, etc.) also participate in the exchange, adding value and creating efficiencies by facilitating the making of such connections and, in some cases, representing and managing the advertising campaigns of multiple entities in the exchange.

When an advertising event occurs (e.g., a user views an advertisement), the event is logged to ensure that payment is made from and to the appropriate entity or entities. A collection of such events over some time period (typically measured in minutes) may be aggregated in accordance with a directed graph model of the system in which the nodes represent the various relevant entities participating in the exchange, and the edges represent the arrangement between the parties, e.g., payment per ad impression, with the direction of each edge indicating the direction of payment. Among other things, the edge might include attributes identifying the specific deal between the connected entities and the amount due for an ad event. A particular ad event might be represented by data corresponding to multiple "hops" between nodes in the directed graph in cases where there are multiple entities between the publisher and the advertisers.

The provider of the advertising exchange periodically aggregates the events for a each deal between each pair of entities in the exchange to ensure that payment from one to the other is effected in a timely and accurate manner. One obstacle to efficiently achieving this goal is presented by the fact that some entities existing in the exchange may be virtual in nature. For example, a virtual entity might be used to represent a consortium of advertisers. In such a case, payment for a particular ad event would not be owed to the consortium, but rather to the advertiser. However, the event data from which payments are determined and aggregated don't necessarily reflect the virtual nature of the intervening entity.

SUMMARY OF THE INVENTION

According to the present invention, systems, methods, apparatus, and computer program products are provided for aggregating event data from an advertising system for billing purposes. Event data for a time period are received from the advertising system. The event data include a plurality of event data records each corresponding to an advertising event occurring during the time period. Each event data record includes a sequence of one or more hop data records. Each hop data record includes a source entity identifier corresponding to a source entity from whom payment for the corresponding advertising event is owed, a target entity identifier corresponding to a target entity to whom payment for the corresponding advertising event is owed, a deal identifier corresponding to a deal between the source entity and the target entity, and a payment amount relating to the advertising event. A virtual hop data record is generated for each of selected ones of the hop data records for which the target entity identifier corresponds to a virtual entity. Each virtual hop data record includes the source entity identifier and the deal identifier from the selected hop data record and the target entity identifier and payment amount from a next hop data record immediately following the selected hop data record in the event data. The payment amounts in the event data are aggregated for each unique combination of source entity, target entity, and deal using the virtual hop data records and disregarding the selected hop data records. Payment is facilitated for each of the advertising events represented in the event data using the aggregated payment amounts.

According to a particular class of embodiments, generating the virtual hop data records includes sequentially evaluating the hop data records in the event data. For each of the selected hop data records, the source entity identifier and the deal identifier are cached. For each of the next hop data records following one of the selected hop data records, the corresponding virtual hop data record is generated by replacing the source entity identifier and the deal identifier in the next hop data record with the cached source entity identifier and the cached deal identifier from the selected hop data record preceding the next hop data record.

According to a more general class of embodiments, systems, methods, apparatus, and computer program products are provided for aggregating edge attributes relating to a directed graph representation of a system. The directed graph representation includes a plurality of paths, each of which includes a plurality of nodes interconnected by a plurality of edges. Path data are collected in which each of a subset of the paths of the directed graph representation is represented by a path data record. Each path data record includes a sequence of one or more edge data records. Each edge data record corresponds to one of the edges and includes a source node identifier corresponding to a source node from which the corresponding edge originates, a target node identifier corresponding to a target node at which the corresponding edge terminates, and a plurality of attributes characterizing a relationship between the source node and the target node. A virtual edge data record is generated for each of selected ones of the edge data records for which the target node identifier corresponds to a virtual node. Each virtual edge data record includes the source node identifier and a first attribute from the selected edge data record and the target node identifier and a second attribute from a next edge data record immediately following the selected edge data record in the corresponding path data record. A third edge attribute in the path data is aggregated for each unique combination of a first plurality of edge attributes using the virtual edge data records and disregarding the selected edge data records.

According to a more specific class of embodiments, generating the virtual edge data records includes sequentially evaluating the edge data records in the path data. For each of the selected edge data records, the source node identifier and the first attribute from the selected edge data record are cached. For each of the next edge data records following one of the selected edge data records, the corresponding virtual edge data record is generated by replacing the source node identifier and the first attribute in the next hop data record with the cached source node identifier and the cached first attribute from the selected edge data record preceding the next edge data record.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the present invention provide mechanisms by which edge attribute data relating to a system that may be represented by a directed graph may be efficiently aggregated despite the presence of virtual entities in the system for which edge attribute data aggregation is not useful or meaningful.

Figure 1:
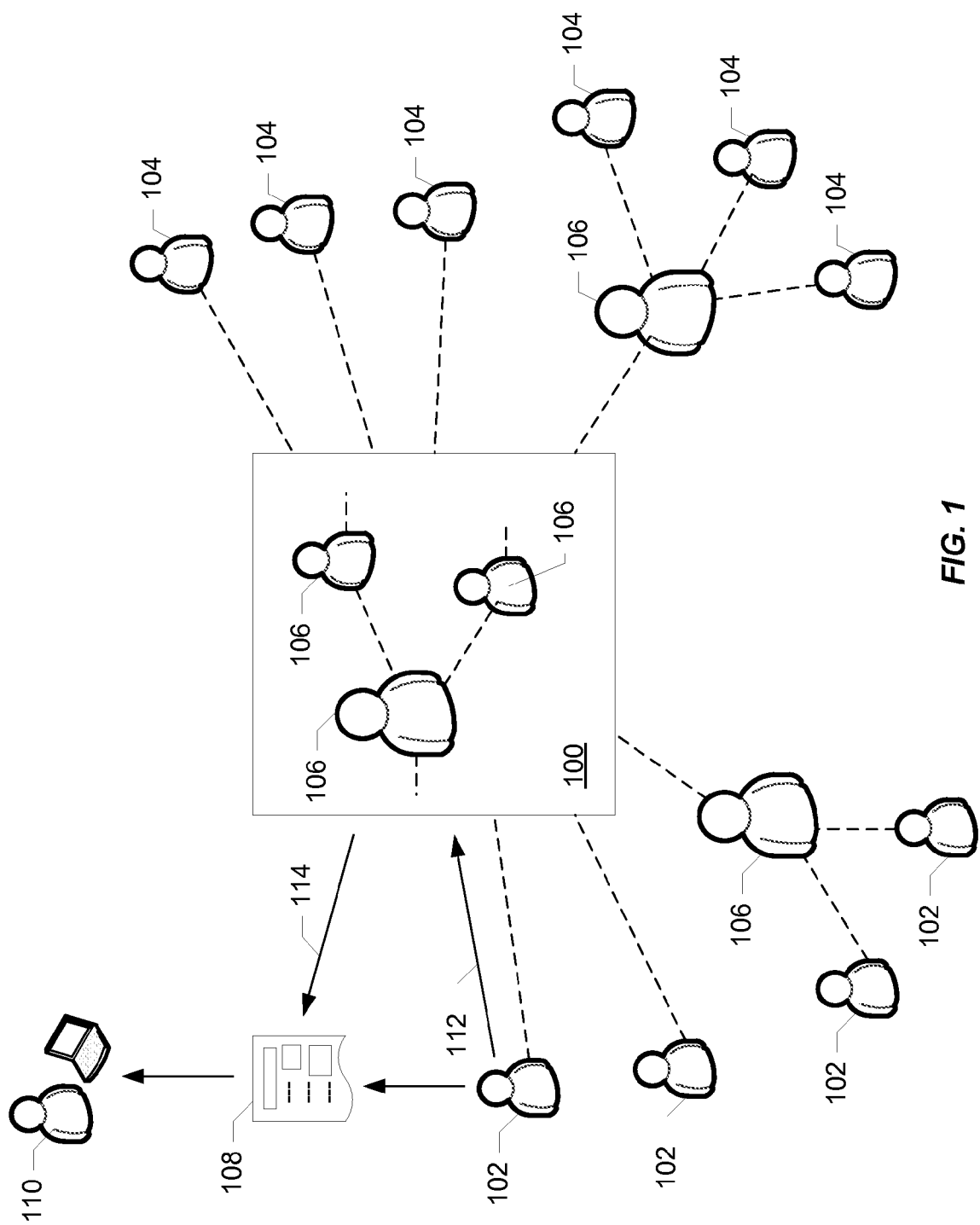
FIG. 1 is a simplified representation of a particular context, i.e., an online advertising exchange, in which embodiments of the invention may be implemented.

FIG. 1 is a representation of an online advertising exchange 100 with which techniques enabled by the present invention may be employed. As mentioned above, advertising exchange 100 provides an efficient mechanism by which the respective inventories of publishers and advertisers may be connected. Participants in the exchange include publishers 102 which are typically small enterprises or individuals (e.g., bloggers) operating relatively small web sites, and advertisers 104 which are also typically relatively small entities. Of course, larger enterprises may participate in such exchanges as well, but typically establish direct relationships and deals with their advertising partners. A number of third parties 106 also participate in the exchange and may include, for example, various types of agencies, networks, groups of networks, consortiums, etc. As mentioned above, such third parties may play a variety of roles and provide a variety of services relating to the exchange. Also as mentioned above, the relationships between the entities participating in the advertising exchange may be modeled as a directed graph in which each entity is represented by a node, and the directed edges connecting particular nodes represent the relationship between the connected nodes.

Regardless of the specific role played or services provided, it is important to note that at least some of the entities participating in the advertising exchange may be "virtual" in nature in that they are provided to facilitate deals between other entities in the exchange, but represent proxies that do not directly participate in exchange transactions. One example of such an entity is a consortium of advertisers or publishers grouped together for the purpose of increasing market leverage and/or sharing costs. A deal with the consortium is, in a sense, replicated across all or some subset of the members of the consortium. Regardless of the nature of a virtual entity in the exchange, it may be characterized by the fact that payment to or from such an entity is not appropriate. Therefore, when ad events are aggregated and payment amounts determined, this needs to be taken into account. An example of an advertising exchange transaction may be illustrative.

Figure 2:
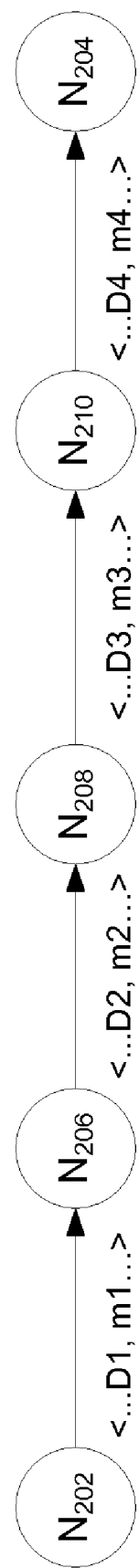
FIG. 2 is a simplified representation of a set of relationships relating to an ad event in an online advertising exchange.

As part of the process by which a web page 108 is delivered from one of publishers 102 to a user 110, an ad call 112 to advertising exchange 100 is generated. Through a competitive bidding process among advertisers 104, advertising content 114 is identified and transmitted for presentation to the user with web page 108. Depending on the economic model, an ad event may occur for which payment is due to one or more parties in response to some action by the user, or simply in response to presentation of the advertisement on the page. In advertising exchanges, there are typically three types of billable ad events: 1) ad impression events when a user sees an ad; 2) click events when a user clicks on an ad; and 3) conversion events when a user buys something from the advertiser. As discussed briefly above, the ad event may implicate a string of entities (e.g., an advertiser, a publisher, and one or more ad-networks) in the ad exchange as represented by the diagram of FIG. 2.

In this particular example, the ad event involves the presentation of the advertising content of a particular advertiser 202 on a web page of a particular publisher 204, e.g., an ad impression, although it will be understood that an ad event may involve other types of events such as, for example, ad clicks or conversion events. The event corresponds to a path through the directed graph model of the ad exchange and includes multiple "hops" that include three intervening entities 206, 208, 210 (e.g., ad networks). As discussed above, these intervening entities may include any of a variety of third parties participating in the exchange. In general, a path through the directed graph model representing an ad event begins with an advertiser and ends with a publisher. Each "hop" in a particular path corresponds to a deal between two entities in the ad exchange that is represented as an edge in the graph.

A data record representing the ad event includes a hop data record for each of the hops included in the event, e.g., an event data record for a given ad event may be represented as a concatenation of the hop data records for that event. Among the wide variety of attribute fields that may be included in a hop data record are a source entity identifier corresponding to the entity from whom payment for the ad event is owed, a target entity identifier corresponding to the entity to whom payment for the ad event is owed, a deal identifier that identifies a deal between the source entity and the target entity, and a payment amount due for the ad event. It will be understood that these attributes are merely examples of some of the attributes that might be represented or employed according to various implementations of the invention. Various suitable combinations of these attributes as well as other suitable attributes will be apparent to those of skill in the art.

The system "listens" for ad events and collects event data on a continuous basis for the purpose of performing a periodic billing data aggregation (e.g., every 10 or 15 minutes). The collected event data records are represented in a large data table in which each hop data record within each event data record is represented as follows:

|...|Ns|Nt|D|m|...| where Ns and Nt denote the source entity and the target entity, D represents the deal, and m represents the payment amount. Of course, it will be understood that this is a simplified representation which should not be considered limiting to the scope of the invention. So, the event data record for the ad event represented in FIG. 2 would be logically represented in the table T as a concatenation of the following hop data records:

|...|$N_{202}$|$N_{206}$|D1|m1|...|

|...|$N_{206}$|$N_{208}$|D2|m2|...|

|...|$N_{208}$|$N_{210}$|D3|m3|...|

|...|$N_{210}$|$N_{204}$|D4|m4|...|

Absent the issue of virtual entities, the billing data aggregation would be straightforward. That is, a relatively simple SQL function may be constructed to determine the total amount owed by one entity to another for the relevant time period by summing the payment amounts m which correspond to each unique combination of Ns, Nt, and D. However, if entity 208 is a virtual entity, such a straightforward approach to aggregation will not work. That is, because entity 208 is virtual, the value for m2 would be zero (i.e., virtual entities are not paid). In addition, the value for m3 would be the amount entity 210 is owed, but it would not be reflected as being paid by the entity who actually owes the amount, i.e., entity 206. In other words, the actual economic relationship is between entities 206 and 210 as represented in FIG. 2 by "virtual hop" 212 represented by the dashed line.

Therefore, according to specific embodiments of the invention, event data records involving virtual entities or nodes are modified to reflect such virtual hops so that accurate billing data aggregation may take place. As will become clear, this is done in a manner which does not compromise the processing of hops which are not virtual. In the example described above with reference to FIG. 2, the representation of the depicted ad event in table T effectively becomes:

|...|$N_{202}$|$N_{206}$|D1|m1|...|

|...|$N_{206}$|$N_{210}$|D2|m3|...|

|...|$N_{210}$|$N_{204}$|D4|m4|...|

The aggregation of payment amounts may then be done without concern for virtual entities. In effect, the hop data records involving the virtual entity 208 are replaced with a virtual hop data record which includes the source and deal identifiers from the first hop data record and the target identifier and payment amount from the second hop data record. It should be noted that in actuality only the second hop data record need be modified in that the first hop data record may be disregarded in the manner described below.

One way of achieving this is to join the table T onto itself where source identifier=target identifier. However, because such an approach may require multiple scans of the data, its utility may be limited given the amount of data involved and the near-real-time processing requirements of some applications. In addition, because virtual entities may appear anywhere in a given transaction, the number of times this computationally intensive operation must be conducted increases with the number of entities in the system.

According to a particular class of embodiments, generation of such virtual hop data records may be achieved without requiring additional scans of the event data. According to a specific embodiment of the invention, each hop data record includes an attribute which identifies whether the target entity is a virtual entity. For example, in the example of FIG. 2, an additional field would be included in each hop data record as follows:

|...|$N_{202}$|$N_{206}$|D1|m1|0|...|

|...|$N_{206}$|$N_{208}$|D2|m2|1|...|

|...|$N_{208}$|$N_{210}$|D3|m3|0|...|

|...|$N_{210}$|$N_{204}$|D4|m4|0|...|

A value of "1" in this additional field indicates that the target entity corresponding to the target identifier in that hop data record is a virtual entity.

Figure 3:
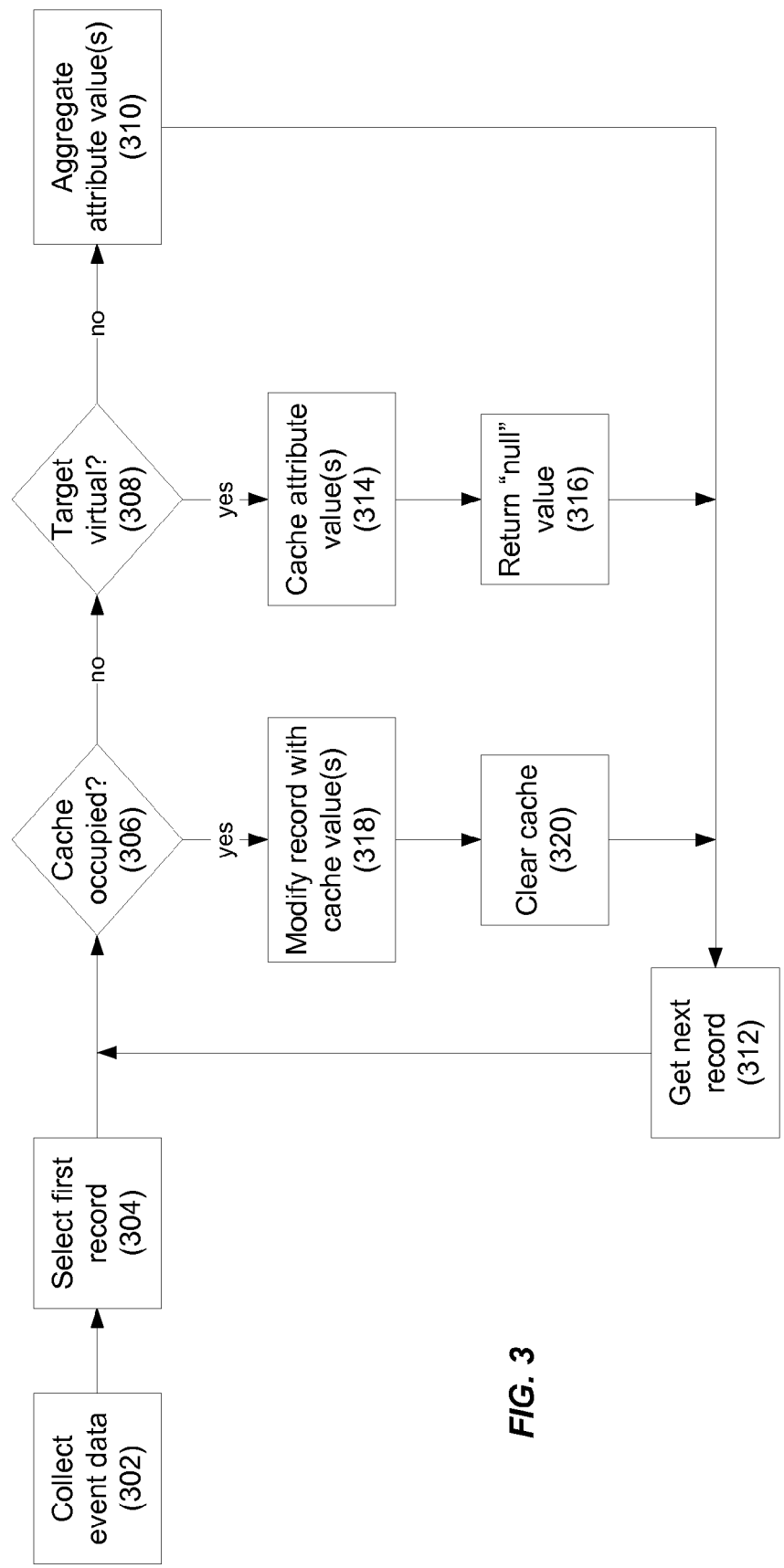
FIG. 3 is a flowchart illustrating the operation of a specific embodiment of the present invention.

Operation of a specific embodiment of the invention in the context of an advertising exchange will now be described with reference to the flowchart of FIG. 3. During (typically regular) intervals, e.g., every 15 minutes, ad event data are aggregated (302). As described above, these data include records for each ad event during the interval. Each event data record includes one or more hop data records, each of which identifies, among other attributes, a source entity, a target entity, a deal, a payment amount, and whether the target is virtual. According to a particular implementation, the event data records are organized in a table in which each row corresponds to a hop data record; the group of hop data records for a given ad event being stored in successive rows in the table.

A billing data aggregation is then performed in which a SQL query engine walks the table and selects each hop data record (304) to determine its contribution to a particular sum of payment amounts (if any). A cache associated with the query engine is first checked to determine whether there are any values stored in the cache (306). If there is nothing in the cache, it is determined whether the target identified in the current hop data record is virtual (308). If the target is not virtual, the payment amount m for the current hop data record is added to an appropriate sum (310), i.e., a sum corresponding to the same source, target, and deal identifiers as the current hop data record. Then the next hop data record is selected for evaluation (312).

If, on the other hand, the target of the current hop data record is virtual (308), the values in source identifier and deal identifier fields of the current hop data record are stored in the cache (314). A "false" or "null" value is then returned (316) so that the current hop data record is ignored by query engine. The next hop data record is then selected for evaluation (312).

As before, the cache is checked (306). If there are values stored in the cache (indicating that the target of the previous hop data record was identified as a virtual entity), the values in the cache are substituted into the corresponding fields of the current hop data record (318), and the cache is cleared (320). In this way, a "virtual" hop data record is created that reflects the correct payment relationship as described above. The payment amount m is then added to the appropriate sum (310). The next hop data record selected (312) unless there are no further records in the table.

Thus, as will be understood, the aggregation of payment amounts can be accomplished along with the identification and disregarding of virtual entities in the data without having to scan the data more than once, or without compromising the processing of records not involving virtual entities. Of course, embodiments of the invention are contemplated in which the order with which these operations occur varies. For example, the aggregation of payment amounts could be performed after all of the relevant hop data records in the data set are modified in the manner described. While such an approach may not have some of the advantages of the approach described above, it is contemplated to be within the scope of the invention.

Embodiments of the invention provide a state-full user defined function that takes a source node and an edge attribute as input (e.g., the source identifier and the deal identifier for an ad event), and behaves as follows. When the target node is virtual, the source node and attribute value are cached. Where the cache is populated, the values in the cache are returned. Where neither of these are the case, the input values are returned. An example of a SQL representation of a function called "virtualHop" that may be used to modify hop data records as described above is provided below. Such a function may be called by a query engine designed to aggregate attribute data in the manner described above.

```
//-----------------------------------------------------------------------
class virtualHop : public Udfv2 {
    public:
        virtualHop (ManagedExpVector* params,Exp::Type type,const map<string,string>& func_data);
        StatusType evaluate( );
    private:
        static t_map cache;
};
t_map virtualHop::cache;
virtualHop::virtualHop( ManagedExpVector* params, Exp::Type type,const map<string,string>& func_data )
    : Udfv2( type ,*params ) {
        if (mParams.size( )!=4 || mParams[0]->type( )!=Exp::STRING || mParams[1]-
>type( )!=Exp::STRING || mParams[2]->type( )!=Exp::INT32 || mParams [3]->type( ) != Exp::INT32) {
            throw Miners::MinersException( "error: virtualHop function takes 4
arguments: key (varchar), value (varchar), pass_through (integer), delete (integer)\n");
        }
    }
StatusType virtualHop::evaluate( ) {
    Exp* p0 = mParams[0];
    Exp* p1 = mParams[1];
    Exp* p2 = mParams[2];
    Exp* p3 = mParams[3];
    const char *key = NULL;
        const char *value = NULL;
        int passThrough = 0, doDelete = 0;
        if (p0->get(key) == FAILURE || p1->get(value) == FAILURE || p2->get(passThrough) ==
FAILURE || p3->get(doDelete) == FAILURE)
            return FAILURE;
        if (passThrough) {
            cache[key] = value;
            mVal.str = "";
            return FAILURE;
        }
        else if (cache.find(key) != cache.end( )) {
            mVal.str = cache[key].c_str( );
            if (doDelete)
                cache.erase(key);
            return SUCCESS;
        }
        mVal.str = value;
        return SUCCESS;
}
extern "C"
{
    Udfv2* create_virtualHop (ManagedExpVector* params,Exp::Type type,const
map<string,string>& func_data) {
        return new virtualHop (params, type, func_data);
    }
}
//-----------------------------------------------------------------------
```

Figure 4:
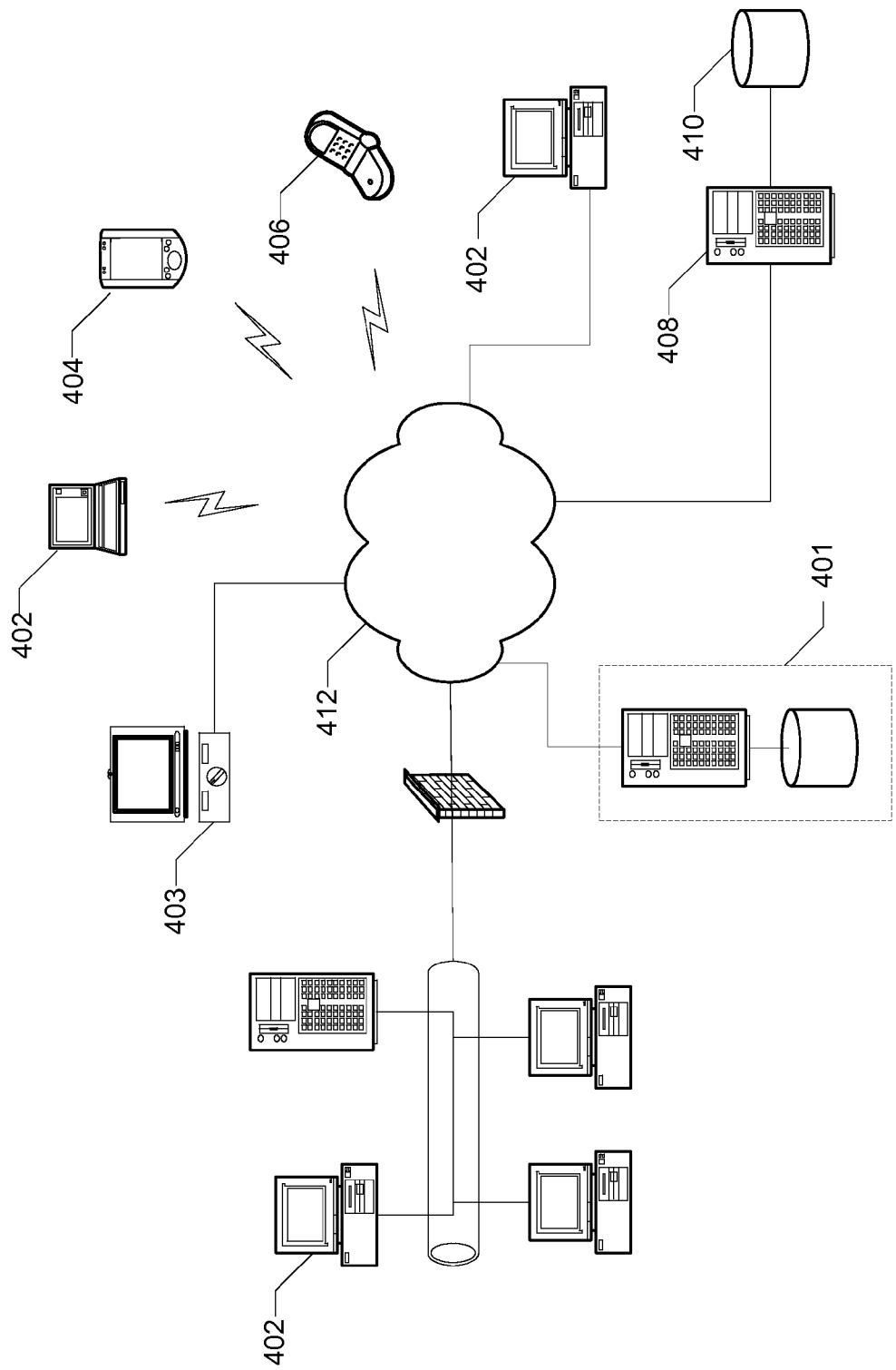
FIG. 4 is a simplified representation of a computing environment in which embodiments of the present invention may be implemented.

Embodiments of the present invention may be employed to aggregate edge attributes for systems that may be modeled or represented with directed graphs in any of a wide variety of computing contexts. For example, as illustrated in the diagram of FIG. 4, implementations are contemplated in which a population of users interacts with a diverse network environment via any type of computer (e.g., desktop, laptop, tablet, etc.) 402, media computing platforms 403 (e.g., cable and satellite set top boxes and digital video recorders), mobile computing devices (e.g., PDAs) 404, cell phones 406, or any other type of computing or communication platform. The population of users might include, for example, consumers to whom the various forms of online advertising are directed. Other entities involved in various embodiments of the invention might include any of the various entities participating in an online advertising exchange such as, for example, publishers of online content, advertisers, advertising partners, merchants, brokers, agents, etc. (represented by web site 401). However, it should again be noted that events in the context of an online advertising exchange are only examples of event data that may be processed according to the invention.

Regardless of the nature of the event data being processed or the associated system, the data may be processed in accordance with an embodiment of the invention in some centralized manner. This is represented in FIG. 4 by server 408 and data store 410 which, as will be understood, may correspond to multiple distributed devices and data stores. The invention may also be practiced in a wide variety of network environments including, for example, TCP/IP-based networks, telecommunications networks, wireless networks, public networks, private networks, various combinations of these, etc. Such networks, as well as the potentially distributed nature of some implementations, are represented by network 412.

In addition, the computer program instructions with which embodiments of the invention are implemented may be stored in any type of computer-readable storage media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. Embodiments of the invention may be used with virtually any system or data set that can be modeled as a directed graph to identify relationships between nodes or entities that are not directly connected. For example, a large enterprise in which employees are organized in a hierarchy of roles and reporting relationships may be modeled in such a manner. In the event that a middle manager leaves the company, an embodiment of the invention may then be employed to identify all employees who are under the authority of that manager's superior, i.e., by designating the middle manager as a "virtual" entity for the purpose of such a determination. The claimed invention should therefore not be limited to the context of an advertising exchange as described above.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for aggregating event data from an advertising system for billing purposes, the method comprising:

receiving the event data for a time period from the advertising system, the event data comprising a plurality of event data records each corresponding to an advertising event occurring during the time period, each event data record comprising a sequence of one or more hop data records, each hop data record including a source entity identifier corresponding to a source entity from whom payment for the corresponding advertising event is owed, a target entity identifier corresponding to a target entity to whom payment for the corresponding advertising event is owed, a deal identifier corresponding to a deal between the source entity and the target entity, and a payment amount relating to the advertising event;

for each of selected ones of the hop data records for which the target entity identifier corresponds to a virtual entity, generating a virtual hop data record including the source entity identifier and the deal identifier from the selected hop data record and the target entity identifier and payment amount from a next hop data record immediately following the selected hop data record in the event data;

aggregating the payment amounts in the event data for each unique combination of source entity, target entity, and deal using the virtual hop data records and disregarding the selected hop data records; and facilitating payment for each of the advertising events represented in the event data using the aggregated payment amounts.

2. The method of claim 1 wherein generating the virtual hop data records comprises:

sequentially evaluating the hop data records in the event data;

for each of the selected hop data records, caching the source entity identifier and the deal identifier; and for each of the next hop data records following one of the selected hop data records, generating the corresponding virtual hop data record by replacing the source entity identifier and the deal identifier in the next hop data record with the cached source entity identifier and the cached deal identifier from the selected hop data record preceding the next hop data record.

3. The method of claim 1 wherein aggregating the payment amounts is done incrementally as each virtual hop data record is generated.

4. The method of claim 1 wherein aggregating the payment amounts is done after all of the virtual hop data records are generated.

5. The method of claim 1 wherein the advertising system comprises an advertising exchange in which the source entities and target entities are participants, and wherein the virtual entities represent one or more of the participants.

6. A computer program product for aggregating event data from an advertising system for billing purposes, the computer program product comprising at least one tangible computer readable medium having computer program instructions stored therein, the computer program instructions being configured to cause at least one computing device to:

receive the event data for a time period from the advertising system, the event data comprising a plurality of event data records each corresponding to an advertising event occurring during the time period, each event data record comprising a sequence of one or more hop data records, each hop data record including a source entity identifier corresponding to a source entity from whom payment for the corresponding advertising event is owed, a target entity identifier corresponding to a target entity to whom payment for the corresponding advertising event is owed, a deal identifier corresponding to a deal between the source entity and the target entity, and a payment amount relating to the advertising event;

for each of selected ones of the hop data records for which the target entity identifier corresponds to a virtual entity, generate a virtual hop data record including the source entity identifier and the deal identifier from the selected hop data record and the target entity identifier and payment amount from a next hop data record immediately following the selected hop data record in the event data;

aggregate the payment amounts in the event data for each unique combination of source entity, target entity, and deal using the virtual hop data records and disregarding the selected hop data records; and facilitate payment for each of the advertising events represented in the event data using the aggregated payment amounts.

7. The computer program product of claim 6 wherein the computer program instructions are configured to cause the at least one computing device to generate the virtual hop data records by:

sequentially evaluating the hop data records in the event data;

for each of the selected hop data records, caching the source entity identifier and the deal identifier; and for each of the next hop data records following one of the selected hop data records, generating the corresponding virtual hop data record by replacing the source entity identifier and the deal identifier in the next hop data record with the cached source entity identifier and the cached deal identifier from the selected hop data record preceding the next hop data record.

8. The computer program product of claim 6 wherein the computer program instructions are configured to cause the at least one computing device to aggregate the payment amounts incrementally as each virtual hop data record is generated.

9. The computer program product of claim 6 wherein the computer program instructions are configured to cause the at least one computing device to aggregate the payment amounts after all of the virtual hop data records are generated.

10. The computer program product of claim 6 wherein the advertising system comprises an advertising exchange in which the source entities and target entities are participants, and wherein the virtual entities represent one or more of the participants.

11. An online advertising exchange system operating in a network and comprising at least one computing device configured to:

connect advertising inventory of participating online publishers with advertising content of participating advertisers to generate advertising events via the network;

receive event data for a time period via the network, the event data comprising a plurality of event data records each corresponding to an advertising event occurring during the time period, each event data record comprising a sequence of one or more hop data records, each hop data record including a source entity identifier corresponding to a source entity from whom payment for the corresponding advertising event is owed, a target entity identifier corresponding to a target entity to whom payment for the corresponding advertising event is owed, a deal identifier corresponding to a deal between the source entity and the target entity, and a payment amount relating to the advertising event;

for each of selected ones of the hop data records for which the target entity identifier corresponds to a virtual entity, generate a virtual hop data record including the source entity identifier and the deal identifier from the selected hop data record and the target entity identifier and payment amount from a next hop data record immediately following the selected hop data record in the event data, each virtual entity representing one or more participants in the advertising exchange;

aggregate the payment amounts in the event data for each unique combination of source entity, target entity, and deal using the virtual hop data records and disregarding the selected hop data records; and facilitate payment for each of the advertising events represented in the event data via the network using the aggregated payment amounts.

12. The online advertising exchange system of claim 11 wherein the at least one computing device is configured to generate the virtual hop data records by:

sequentially evaluating the hop data records in the event data;

for each of the selected hop data records, caching the source entity identifier and the deal identifier; and for each of the next hop data records following one of the selected hop data records, generating the corresponding virtual hop data record by replacing the source entity identifier and the deal identifier in the next hop data record with the cached source entity identifier and the cached deal identifier from the selected hop data record preceding the next hop data record.

13. The online advertising exchange system of claim 11 wherein the at least one computing device is configured to aggregate the payment amounts incrementally as each virtual hop data record is generated.

14. The online advertising exchange system of claim 11 wherein the at least one computing device is configured to aggregate the payment amounts after all of the virtual hop data records are generated.

* * * * *